United States Patent [19]

Cooper et al.

[11] 3,922,494

[45] Nov. 25, 1975

[54] DATA SIGNAL SWITCHING APPARATUS

[75] Inventors: Gordon Arthur Cooper, Horndean; Kenneth Douglas Goddard, Alton; Gordon Campbell Lowe, Farnborough, all of England

[73] Assignee: British Minister of Defence, London, England

[22] Filed: Mar. 25, 1974

[21] Appl. No.: 454,502

[30] Foreign Application Priority Data

Mar. 26, 1973 United Kingdom ............... 14465/73

[52] U.S. Cl. ....... 179/15 BV; 179/15 A; 179/15 BA

[51] Int. Cl.$^{2}$ ............................................. H04J 3/00

[58] Field of Search ......... 179/15 A, 15 BV, 15 BA, 179/15 AT, 18 GF

[56] References Cited

UNITED STATES PATENTS

| | | | |
|---|---|---|---|
| 3,665,417 | 5/1972 | Low | 179/15 BV |
| 3,668,645 | 6/1972 | Reymond | 179/15 BA |
| 3,692,942 | 9/1972 | Inose | 179/15 A |
| 3,708,786 | 1/1973 | Hardin | 179/15 BV |
| 3,790,715 | 2/1974 | Inose | 179/15 A |

*Primary Examiner*—Ralph D. Blakeslee
*Attorney, Agent, or Firm*—Elliott I. Pollock

[57] ABSTRACT

Versatile data-signal switching apparatus for controlling the switching and time-division multiplexing of signals appearing on a multitude of data input channels, comprising a pulse generator and a timing circuit for forming a sequence of pulses at a time-slot rate and sequences of pulses recurring at each of several required sampling rates, a working store which can store one address word for each sampling rate, address resetting means responsive to each pulse of each sequence so as to replace an address word in the working store with a starting address word associated with the rate of the sequence to which the pulse belongs, a time-division multiplex gating circuit, and a logic circuit constructed to select one address word from the working store during each time-slot, apply the selected word to the multiplexer address input, and add a prescribed increment to the selected word in the working store. The time-slots may be subdivided so that actions on address words associated with a given sampling rate are done in an associated subdivision of each time-slot.

5 Claims, 6 Drawing Figures

DATA SIGNAL SWITCHING APPARATUS

Figure 1:
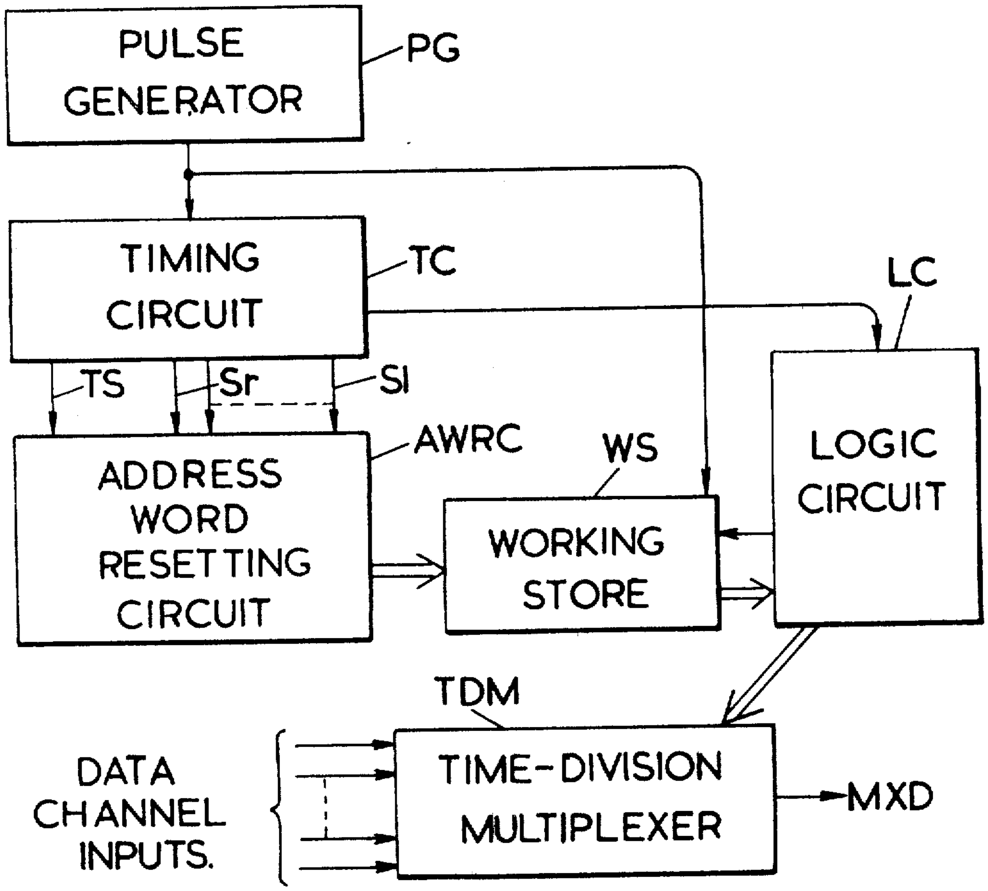

The present invention relates to data-signal switching apparatus for controlling the switching and time-division multiplexing of signals appearing on a multitude of data input channels. For experimental testing, or for monitoring the operation of complex equipment, or for any analogous operations, it is often necessary to have a facility for transmitting data signals from a large number of transducers of various kinds to a monitoring and recording equipment by a time-division multiplex system.

Clearly it is desirable that the apparatus provided should be as versatile as possible consistent with limitations of size, weight and cost which may in many cases be very stringent. It is, for example, desirable to provide a facility which can be readily set to pass signals of assorted types satisfactorily, and to provide for sampling various data input channels at various selectable sampling rates so that frequent samples are taken from some input channels and less frequent samples from others. It is also very desirable and obviously more difficult to provide a facility for altering the selection of data input channels being monitored and altering the sampling rates in use, at will as may be desired during a series of observations. It is an object of the present invention to provide apparatus making available at least a selection of such facilities in a comparatively compact and not unduly expensive arrangement. One intended application of the invention is to provide apparatus to control the multiplexing of data signals on-line in new or prototype aircraft on test flights.

According to the present invention there is provided a versatile data-signal switching apparatus, for controlling the switching and time-division multiplexing of signals appearing on a multitude of data input channels so that the signals on various data input channels will be sampled at various selected sampling rates and transmitted in a time-division multiplex cycle with a prescribed time-slot rate, the said apparatus including:

a pulse generator for providing pulses at a rate $p$ times the time-slot rate, where $p$ is a positive integer;

a timing circuit controlled by the pulse generator for forming a sequence of pulses at the time-slot rate and also forming sequences of pulses recurring at each of the required sampling rates;

a working store capable of storing one address word for each of the sampling rates required;

address resetting means controlled by the timing circuit, capable of storing a set of starting address words comprising one starting address word for each sampling rate and constructed to act in response to each pulse of each sequence by replacing one of the address words in the working store with the starting address word associated with the sampling rate of the sequence to which the pulse belongs;

a time-division-multiplex circuit which includes a plurality of gate circuits separately connected to different data input channels, address input means, and a decoder circuit connected to control the gate circuit so as to respond to the application of an address word to the address input means by enabling an associated one of the gate circuits to pass signals from the data input channel to which it is connected;

and a logic circuit controlled by the timing circuit, constructed to select one of the address words held in the working store in each time-slot, to copy the selected word on to the address input means of the time-division-multiplex gating circuit, and to add a predetermined increment to the selected word in the working store.

The pulse generator may be constructed to provide pulses at a rate $p$ times the total number of time slots in each multiplex cycle where $p$ is an integer not less than the number of different sampling rates required, whereby each time slot is sub-divided into $p$ subdivisions wherein one or a few sub-division may be allocated for controlling operations but most if not all of the sub-divisions are individually associated with the sampling rates so that each subdivision is associated with one prescribed sampling rate and each sampling rate is associated with a given one of the sub-divisions in each time-slot; and the working store may be a recirculating store of $p$ stages having a shift input connected to receive the pulses from the pulse generator.

The apparatus may be constructed to sample and transmit signals, from a multitude of data input channels, at various selectable relative sampling rates which have a binary relationship. For instance it may be set up to sample $a_1$ separate and independent data input channels once per frame, plus $a_2$ data input channels twice per frame, plus $a_3$ channels four times per frame, etcetera, where $a_1, a_2, a_3 \ldots$ are any chosen positive integers and a frame is the duration of one complete multiplex cycle. The fastest sampling rate required may be $2^{r-1}$ samples per frame and may be required on $a_r$ data input channels, where $a_r$ is any positive integer and $r$ is the number of different sampling rates provided, which may be any integer greater than +1. Then the total number of samples to be transmitted in each frame will be $$\sum_{i=1}^{i=r} a_i 2^{i-1}.$$

There must be at least one time-slot for each sample, so the number of N time-slots in each frame must be greater than the total number of samples. It is also desirable that N should be an exact multiple of the highest relative sampling rate. Hence N should be $n$ times $2^{r-1}$ where $n$ is an integer and $n$ must be large enough to make:

$$N = n^{r-1} \geq \sum_{i=1}^{i=r} a_i 2^{i-1}$$

The frame rate (number of multiplex cycles per unit time) may also be selectable, and the actual or absolute sampling rate provided will be given by the product of the frame rate and the relative sampling form for any signal. instance, In the operation of the system the individual data input channels are associated with address words, chosen so that the address words associated with the channels of a group required to be sampled at a given sampling rate form a sequence which can be readily generated by repeated similar actions. For instances, the channels of any typical group may be associated with address words forming an arithmetic progression, which can be generated by successive addition of a prescribed increment. Thus the $a_i$ channels which are to be sampled at a rate of $2^{i-1}$ samples per frame may be associated with address words $x_i$, $x_i+d$, $x_i+2d$, . . . $x_i+$ $(a_i-1)d$ respectively, where $x_i$ and $d$ are any chosen integers. For simplicity, $d$ may be made equal to one or minus one. In general for each of the $r$ sampling rates there will be a distinct group of data input channels, associated with a sequence of address words. The sequences begin with predetermined starting address words $x_1$, $x_2 \ldots x_r$ respectively and successive terms in all the sequences can be generated by applying similar actions repeatedly (eg always adding one to the preceding term). However, it is not necessary for all the sampling rates to be used in every application; in some cases there may be no data input channels to be sampled at one of the possible rates — then this rate is in effect associated with a group having no members and no corresponding address words.

At the heart of the apparatus the working store holds at least $r$ address words at any given time, which are utilized to generate address commands synchronously with the time-division-multiplex cycle to determine which data input channel should be sampled in each time-slot so that the required sampling rates are suitably maintained. The starting address words $x_1, x_2 \ldots x_r$ are stored in a scan store and are used to reset entries in the working store at appropriate times. The address commands which determine the channels to be sampled are derived by copying words selected from the address words held in the working store by a logical process which gives priority to the channels according to the required sampling rates. Whenever an address word has been selected it is replaced in the working store by the next address word in its sequence. Starting address entries for a given sampling rate are reset into the working store at that sampling rate as determined by the timing circuit. The choice of data input channels to be sampled, and the choice of sampling rates to be applied to them, may be readily altered by changing the contents of the scan store. The data input channels to be sampled may be addressed in the time-division multiplexer circuit by commands derived according to any predetermined scheme comprising a specified one-to-one mapping from the address words selected by the logic circuit from the working store. This derivation may involve an address decoder and/or an address translator circuit, which may also be arranged to provide a further facility for changing the choice of channels to be sampled. An address translator circuit may also provide further signals which represent characteristics of the signals to be sampled on the selected channels and may be used to set parameters such as the operating mode, gain, and bandwidth of associated equipment.

Figure 6:
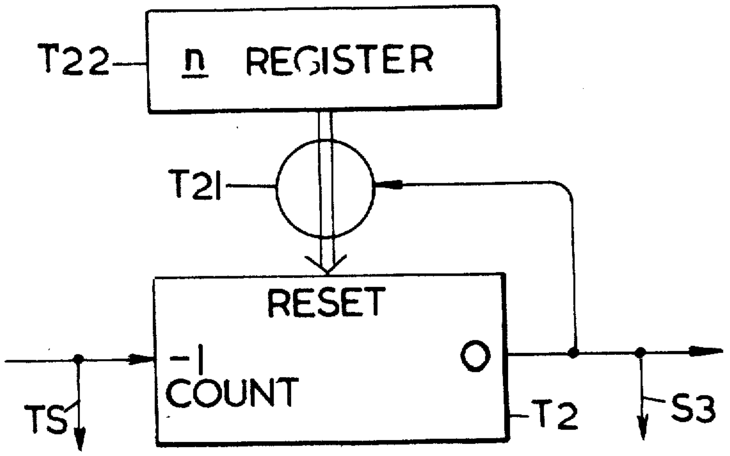
Figure 2:
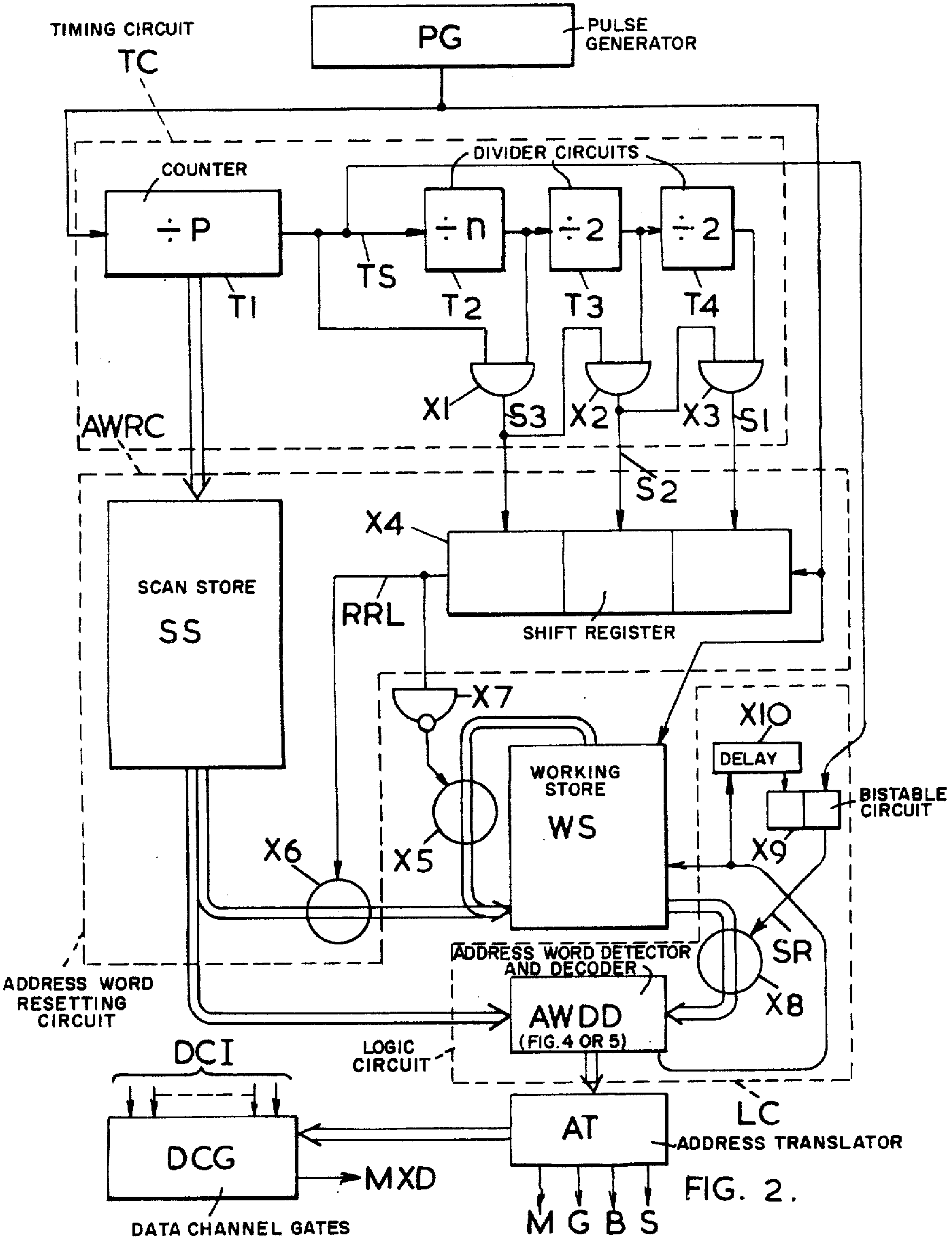
Figure 3:
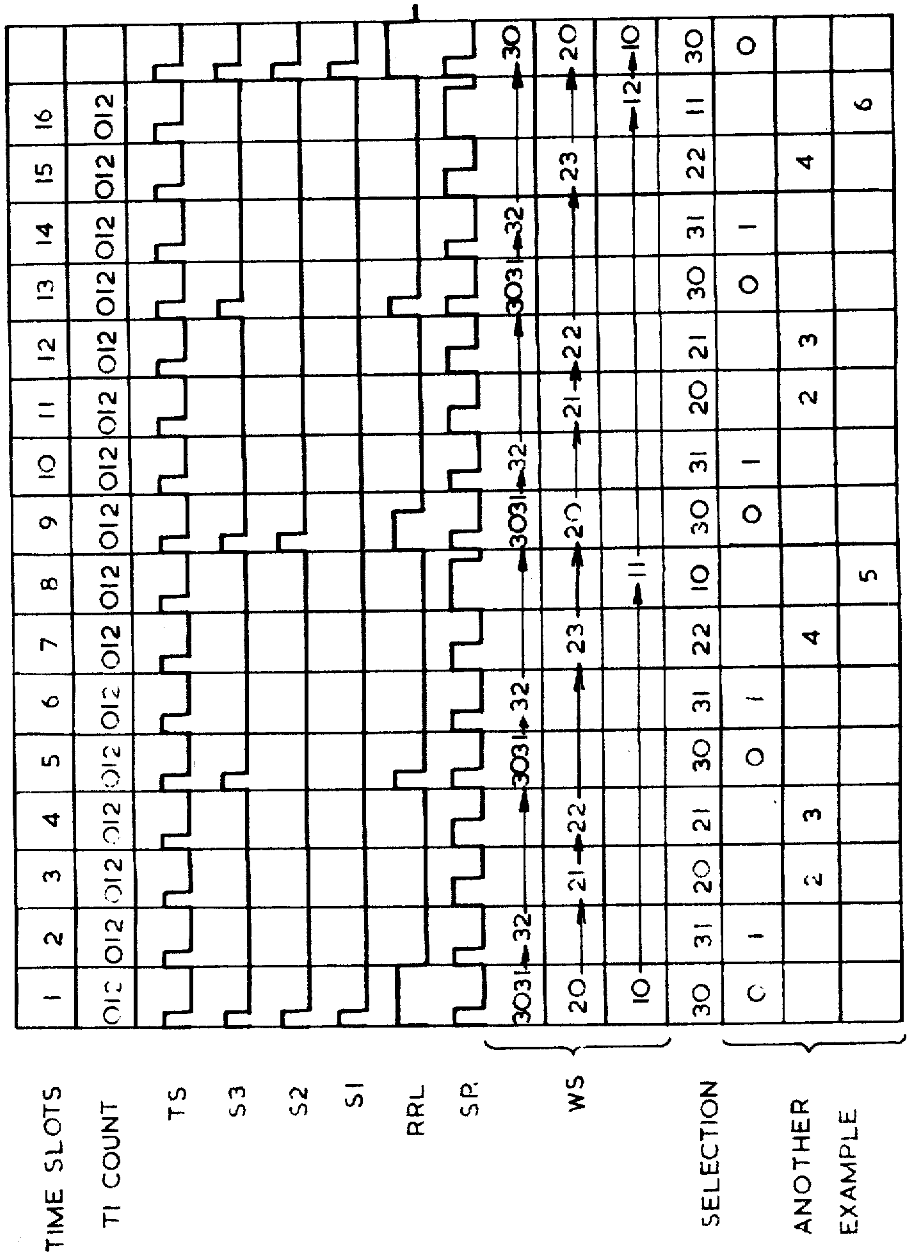
Figure 4:
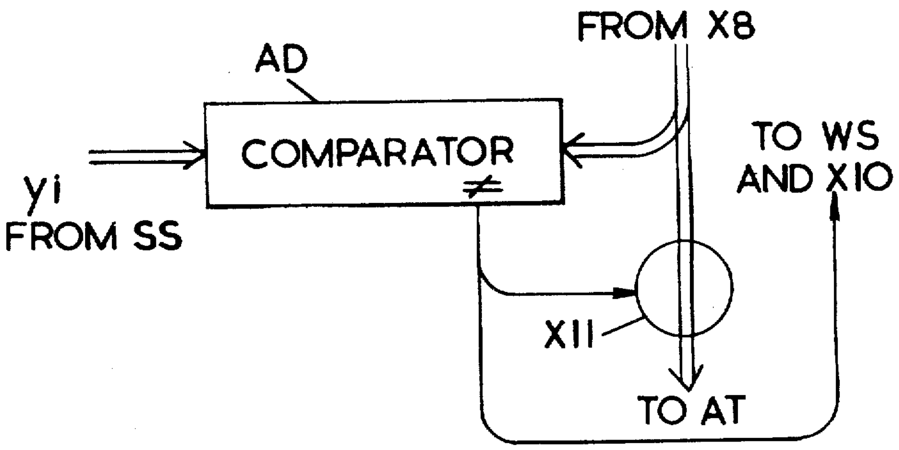
Figure 5:
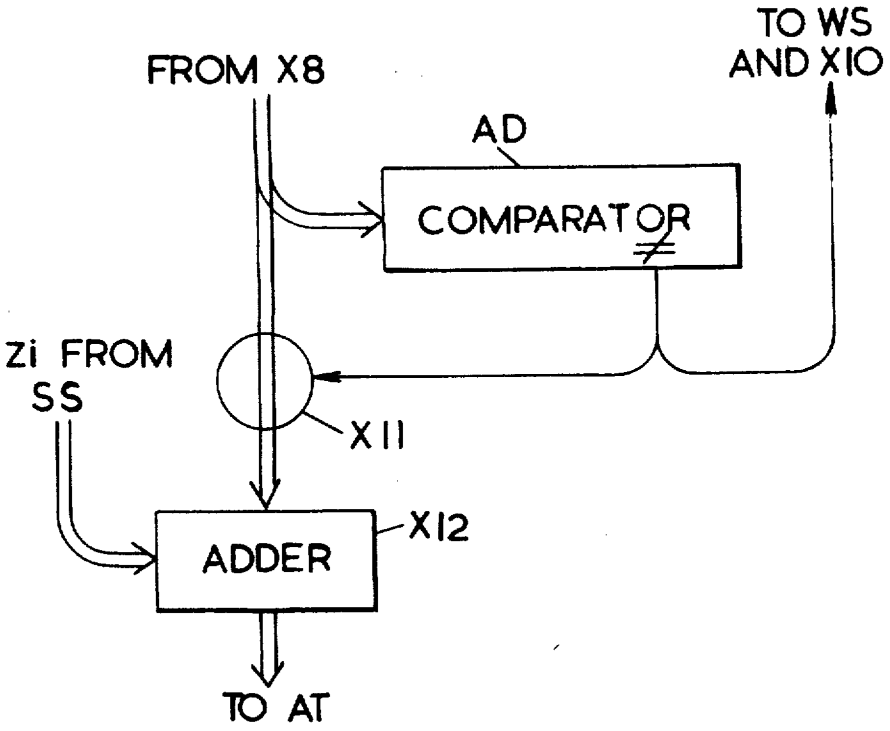

Embodiments of the invention will now be described, by way of example only, with reference to the accompanying drawings, of which:

FIG. 1 is a schematic block circuit diagram showing the general arrangement of a data-signal switching apparatus, FIG. 2 is a partly schematic circuit diagram showing more details of one form of the apparatus, FIG. 3 is a graphical diagram of signals occurring in a typical application of the apparatus of FIG. 2, FIGS. 4 and 5 are schematic diagrams of alternative forms for a part of the apparatus of FIG. 2, and FIG. 6 is a schematic circuit diagram of another part of the apparatus of FIG. 2.

In these drawings, single lines represent single-wire connections generally carrying simple binary signals whereas double lines represent connections capable of carrying multi-digit binary signals. The data channel inputs could be made to carry any kind of signals and should not be regarded as limited to simple binary signals.

FIG. 1 shows the basic arrangement of the apparatus which comprises a pulse generator PG, a timing circuit TC, an address-word resetting circuit AWRC, a working store WS, a logic circuit LC and a time-division multiplexer circuit TDM. The pulse generator PG is made to produce pulses at $p$ times the time-slot rate, which will be $pNf$ pulses per second where $f$ is the frame rate or number of complete multiplexing cycles per second to be used in the system. These pulses are applied to the timing circuit TC and to the working store WS. By conventional pulse counting techniques the timing circuit TC derives a sequence of pulses at the time-slot rate on a line TS, and sequences of restarting pulses at each of the required sampling rates on lines $S_r$ to $S_1$; thus $2^{r-1}$ pulses per frame appear on line Sr, and only 1 pulse per frame on the line S1. These pulse sequences control the address word resetting circuit AWRC so that it applies prescribed starting address words $x_r, x_{r-1}, \ldots x_1$ to a data input of the working store WS at appropriate times synchronized with the restarting pulse sequences on the lines $S_r, S_{r-1}, \ldots S_1$ respectively. Address words from the working store WS are applied to the logic circuit LC, which will select one address word in each time-slot and pass a copy of the selected word or an address command derived from the selected word to an address input of the multiplexer TDM. The logic circuit LC also causes each selected address word to be replaced in the working store by the next address word in its sequence. The time-division multiplexer TDM includes gate circuits controlled so that in response to each address command applied to its address input the signal on a corresponding one of a plurality of data channel inputs will be sampled and passed to an output line MXD.

FIG. 2 shows one possible form of the apparatus in greater detail. For the sake of simplicity, an apparatus in which $r = 3$, providing only three sampling rates, is shown. In FIG. 2 the timing circuit TC is shown to comprise a modulo-$p$ counter circuit T1, a chain of pulse rate divider circuits T2, T3, T4, and three and-gates X1, X2, X3. An output of the modulo-$p$ counter T1 which is energized once in every count of $p$ pulses from the pulse generator PG is connected to the line TS and to the input of the pulse-rate divider T2. The pulse rate divider T2 sends one pulse out to the pulse-rate divider T3 for every $n$th pulse received from the counter T1. The remaining pulse rate dividers in the chain are pulse rate halving stages. The and-gate X1 has inputs separately connected to the line TS and the output of the pulse-rate divider T2; its output feeds the line S3. The and-gate X2 has inputs separately connected to the line S3 and the output of the pulse-rate divider T3; its output feeds the line S2. Similarly the and-gate X3 has inputs separately connected to the line S2 and the output of the pulse-rate divider T4; its output feeds the line S1.

The address-word resetting circuit includes a scan store SS which has an address input connected to receive signals representing the current value of the count in the modulo-$p$ counter T1. When the apparatus is operating the scan store SS will be loaded with at least $r$ starting address words $x_1, x_2, \ldots x_r$. It may be permanently loaded with prescribed address words, but preferably there will be either a facility for altering the contents of the scan store or a facility for using any one of a plurality of scan stores or any section of several sections of a scan store holding different sets of prescribed address words. The latter facility may comprise a manual switch connected for selecting the most significant bits of a scan store address while the signals from T1 form the rest of the address.

A shift register X4 has a shift input connected to receive the pulses from the pulse generator PG, and successive stages connected to the outputs of the and-gates X3, X2, X1 respectively (by lines S1, S2, S3).

The working store WS is a recirculating store of $p$ stages, with a shift input connected to receive the pulses from the pulse generator PG, and connections for recirculating address words from the last stage of the working store WS through a gate circuit X5 to its own data input. Data output connections from the scan store SS are connected through a gate circuit X6 to the data input of the working store. An output from the last stage of the shift register X4 is connected to control the gate circuit X6 directly, and through an inverter X7 to control the gate circuit X5. Other data output connections from the scan store SS are applied to an address-word detector and decoder AWDD which forms part of the logic circuit LC.

The address-word detector and decoder AWDD is also connected to receive address-word signals from the working store WS through a gate circuit X8, and has a control output which is connected to an increment-adding input of the working store WS, and through a delay X10 to a resetting input of a bistable circuit X9. The bistable circuit X9 has a setting input connected to the line TS, and an output connected to control the gate X8.

The address-word detector and decoder AWDD has an address output connected to an address translator unit AT. The address translator AT has four control output lines M, G, B, S and also has address output connections which control a set of gates DCG. The gates DCG receive data channel inputs DCI and are connected to a common output line MXD. The unit AT and gates DCG constitute the time division multiplexer TDM.

The scan store SS is a conventional store having at least $p$ storage locations, which will be addressed consecutively as the counter T1 counts from 0 to $p-1$. The prepared contents of the storage locations will therefore be presented consecutively to the data output connections of the scan store, and they will be arranged to appear in order according to the sampling rates with which they are associated; data relating to the group of channels which are to be sampled at the highest sampling rate will be presented first. As hereinbefore described the data input channels will be associated with address words so that the channels of a group required to be sampled at a given rate will be associated with address words forming a sequence; thus the channels to be sampled $2^{i-1}$ times per frame will be associated with address words comprising a sequence $x_i, x_i+d, \ldots x_i+\lambda(a_i-1)d$.

For each sampling rate there will be a group of channels associated with a given sequence of address words. The address word sequences will begin with arbitrarily predetermined starting addresses $x_1, x_2 \ldots x_r$. Their subsequent terms can be derived by successive additions. When an addition is made to the last term of a sequence, a stop value will be reached and these stop values can be calculated. Let the typical stop value $x_i+a_id = y_i$. When any rate is not to be used, the associated sequence will be simply replaced by a stop value.

In the simplest form of the apparatus $p$ may be equal to $r$, the number of different sampling rates required, and the scan store SS will present to the gate X6 the arbitrary starting addresses $x_r, x_{r-1}, \ldots x_1$ in synchronism with the counting of the counter T1. However, these signals will only be passed through the gate X6 to the store WS on occasions determined by the output of the shift register X4 which is set by the pulses developed on the lines Sr to S1. With $r=3$, the circuit AWRC passes the term $x_3$ to the working store WS four times per frame in subdivisions of time-slots determined by the signals on S3; it also passes the term $x_2$ to the store WS twice per frame in subdivisions of time-slots determined by the signals on S2, and passes the term $x_1$ to the store once per frame in a subdivision of a time-slot determined by the signals on S1.

FIG. 3 illustrates the signals involved in a typical multiplex cycle for a case in which $a_3=2$, $a_2=3$, $a_1=2$, $n=4$, $p=r=3$, drawn against a common horizontal time axis. For convenience the time-slots of the cycle are numbered at the head of the figure. The first line below this represents the count in the counter T1 in decimal notation. The next four lines show the pulses on the lines TS, S3, S2 and S1. The sixth line shows the output from X4 which is called the rate reset line (RRL) signal. The seventh line shows the output of X9 which is called the sample required (SR) flag. The eighth, ninth and tenth lines indicate the contents of the working store for an example in which $x_3=30$, $d=+1$, $x_2=20$, $x_1=10$ which makes the stop values $y_3=32$, $y_2=23$, $y_1=12$. These three lines could also be interpreted more generally if 32 is taken as a compact notation representing $x_3+2d$, etcetera, in the notation hereinbefore described.

In this part of the drawing symbols are shown only where a change has been made, and arrowed lines indicate that the address represented by the symbol shown before the line (at the tail of the arrow) is circulated without alteration until the time indicated by the point of the arrow is reached. The eleventh line represents the address-words selected by the logic circuit LC. To make this a little clearer the last three lines show the selected address-words for a case where $x_3=0$, $d=1$ and the stop value of each sequence equals the first term of the next sequence, so that there are channels 0 and 1 to be sampled four times per frame, 2, 3 and 4 to be sampled twice per frame, and 5 and 6 to be sampled once per frame. The selected words are shown on three lines according to their sampling rates, to show more clearly the effect of the procedure described.

As shown in FIG. 3, the cycle begins when the lines TS, S3, S2 and S1 are all pulsed simultaneously. This sets up a binary number 111 in the shift register X4, and therefore causes the RRL signal to remain at the one level throughout the whole of the first time slot. During the first sub-division of the time-slot when the count in T1 is 00, the address-word $x_3=30$ is passed from the scan store SS through the gate X6 to the working store WS. Thence it is passed through the gate X8 and examined in the AWDD circuit. The AWDD circuit has to determine whether it is receiving an address-word eligible for selection or a stop value; this can be done in various ways as will be described hereinafter. Since the address-word $x_3=30$ is not a stop value it will be selected and the AWDD circuit then applies a signal to its control output, which causes the address-word signal $x_3 = 30$ in the working store WS to be altered to $x_3+d = 31$ and cancels the sample required flag SR by resetting the bistable circuit X9.

During the second sub-division of the first time-slot, when the count in T1 is 01, the address-word $x_2 = 20$ is passed from the scan store SS through the gate X6 into the working store WS, but since the sample required flag SR has been cancelled it cannot pass through the gate X8. During the third sub-division of the first time-slot, the address-word $x_1 = 10$ is similarly passed from the scan store SS to the working store WS but cannot pass the gate X8.

In the second time-slot the shift register X4 contains all zeros and the signal RRL remains at the zero level so the gate X6 is closed, gate X5 is open, and the signals in the working store are recirculated. During the first sub-division, the sample required flag is set up again by the TS line signal and the address-word $x_3 + d = 31$ is allowed to pass through the gate X8 to the AWDD circuit. It is selected and the control output of the AWDD circuit acts as before, altering the word $x_3 + d = 31$ in the working store to $x_3 + 2d = 32$ and cancelling the sample required flag. Since this closes the gate X8, the signals $x_2 = 20$ and $x_1 = 10$ are simply recirculated with no consequent action.

In the third time-slot the RRL signal remains at the zero level while the sample required signal is set up again as before. This time, however, when the address-word $x_3 + 2d = 32$ is applied through X8 to the AWDD circuit it is recognized as a stop value not eligible for selection. The sample required flag therefore remains set until the second sub-division of the time-slot when the circulation of address-words in the working store applies the address-word $x_2 = 20$ through the gate X8 to the AWDD circuit. This is recognized as an eligible address-word and selected. The control output of the AWDD circuit then alters the word $x_2 = 20$ in the working store to $x_2+d = 21$ and cancels the SR signal.

Similarly in the fourth time-slot $x_3 + 2d = 32$ is recognized as a stop value but $x_2 + d = 21$ is selected, and altered to $x_2 + 2d = 22$ in the working store. In the fifth time-slot, however, the line S3 puts a one signal in the leading stage of the shift register X4, which allows the stop value $x_3 + 2d = 32$ to be reset to the initial value $x_3 = 30$. The actions in the fifth and sixth time-slots therefore correspond to the actions in the first and second time-slots except that the RRL signal drops to the zero level after the first sub-division of the fifth time-slot, so that the address-words $x_2 + 2d = 22$ and $x_1 = 10$ are recirculated without further action.

In the seventh time-slot, the stop value $x_3 + 2d = 32$ is recognized, the address-word $x_2 + 2d = 22$ is selected, and in the working store it is altered to $x_2 + 3d = 23$. In the eighth time-slot, this address-word $x_2 + 3d = 23$ is also recognized as a stop value so that the SR signal is allowed to stay at the one level until the third sub-division of the time-slot. Then the address-word $x_1 = 10$ is selected and altered to $x_1 + d = 11$ in the working store.

In the ninth time-slot, both the lines S3 and S2 are pulsed so the RRL signal stays at the one level for two sub-divisions and the stop values $x_3 + 2d = 32$ and $x_2 + 3d = 23$ are both replaced by the corresponding initial values $x_3 = 30$ and $x_2 = 20$. It follows that the selections in the time-slots from 9 to 15 inclusive repeat the corresponding actions of time-slots 1 to 7 inclusive while the address-word $x_1 + d = 11$ is simply recirculated without alteration. In the 16th time-slot, the stop values $x_3 + 2d = 32$ and $x_2 + 3d = 23$ are both energized and the address-word $x_1 + d = 11$ is selected. This completes a cycle, which repeats indefinitely.

The choice of address-words may be arbitrary within certain limits and will be determined by the contents of the scan store SS. The whole cycle and its parameters may be radically altered by changing the words held in the scan store or using another part of the scan store which contains different words. The apparatus thus provides a highly versatile arrangement for controlling scanning and multiplexing sequences. It should be noted that the apparatus samples every channel at regular intervals as required. As hereinbefore mentioned this is more clearly shown by the last three lines of FIG. 3, which show the selections made in a similar case with a different choice of address-words.

FIG. 4 shows a form for the AWDD circuit which could be used for the examples hereinbefore described. It comprises a comparator or address detector circuit AD which has separate word inputs for receiving multi-digit signals from the scan store SS and the gate X8 respectively, and a gate circuit X11. The comparator AD has a control output which is energised whenever its word inputs receive non-identical combinations of signals. The word input connections ensure that whenever the comparator receives an address-word signal from the gate X8, it also receives the corresponding stop value from the scan store SS. In each time-slot, the first eligible address-word to be received causes the control output of the comparator to be energized. This opens the gate X11, allowing the selected word to pass through to the address translator AT.

However, the address-words used may be chosen to allow a different form of AWDD circuit to be used. For instance, they may be chosen to make all the stop values equal to a given number which can be all zeros. Then the initial values $x_i$ can conveniently be equal to $a_i$ for all values of $i$ and $d$ made minus one. In this case any word which is all zeros must be a stop value and any word having at least one non-zero digit may be taken to be an eligible address-word. The address-words will not then be unique, but they can be used to derive unique addresses by adding numbers dependent on the sampling rates with which they are associated, which are indicated by the time-slot sub-division in which they are selected. Thus if an address-word $c$ is selected during the first sub-division of a time-slot indicating that it refers to a $c$th one of the group of channels to be sampled at the highest rate, it should have a number $Z_r$ added to it. If an address-word $c$ is selected during the last sub-division, indicating that it refers to a $c$th one of the group of channels to be sampled once per frame, it should have a number $Z_1$ added to it. The numbers $Z_r$ to $Z_1$ may be arbitrarily chosen so that these additions will form unique addresses; they may be held in the scan store SS.

FIG. 5 shows a modified form of AWDD circuit suitable for this arrangement. Here the comparator AD may be a simple OR-gate circuit which energizes its control output whenever its word input receives any non-zero digit signal. Clearly this does not need any connection to the scan store. However, the output of the gate X11 is now applied to a digital adder circuit X12 which receives the numbers $Z_r$ to $Z_1$ from the scan store SS, and passes the results of its summations to the address translator AT.

Clearly there are various other possibilities which could be realized with other appropriate forms of AWDD circuit. For instance, the address-words could be chosen to make the stop values equal to multiples of the count in the counter T1. Alternatively, stop values could be identified by counting the number of selections made for each sampling rate, inhibiting further selections for that rate when the predetermined number $a_i$ of selections has been made, and resetting the count at the required sampling rate.

It will be clear to persons skilled in the art that some precautions may be needed to ensure that the actions described occur in the correct sequence, and this may require some additional slight delays or electrical interlocks in various signal paths. It may for instance be desirable to advance the described address-resetting operations of the AWRC circuit by a fraction of a time-slot relative to the selection and incrementing operations of the LC circuit; this can be more easily arranged if $p$ is made slightly greater than $r$ so that there are one or two spare sub-divisions in each time slot. Alternatively the divider T1 of FIG. 2 may be modified to provide various output pulse trains all of the same frequency but with various relative phase displacements for operating various parts appropriately in sequence.

The apparatus will be more versatile if the pulse-rate divider T2 is not limited to a set dividing ratio, and therefore the modification shown in FIG. 6 may be used. Here the divider T2 takes the form of a decrementing counter which can be reset to any number $n$ by signals applied to it from a register T22 through a gate T21. Pulses from the line TS are applied to a decrementing input so that the count in the counter T2 will be decreased by 1 for each pulse from the counter T1. Whenever the count reaches zero, the counter T2 energizes an output which is connected to the line S3 and also controls the gate T21 so that the counter T2 is reset to $n$ after every $n$th count. The register T22 may be loaded from scan store SS. In this case, $p$ may be made slightly greater than $r$ so that the scan store SS may be caused to refill the register T22 in one spare sub-division of every time slot; the signals required may be passed through a spare location in the working store WS. The facility for setting $n$ from the scan store SS can be used to change the frame length when the scan store is changed to provide a different multiplexing cycle. If $p = r + 2$ another space in the scan store can be used to store a word for controlling the tape speed of a recorder (not shown) for recording the multiplexed signals, and for controlling the pulse generator PG to make it operate at a selected one of several pulse repetition rates. This facility may be used to ensure a constant packing density of data signals on a recording of the multiplexed signals. Alternatively, the extra word can be used to specify a desired packing density, and used to control either the tape speed or the pulse repetition rate to achieve the desired packing density. The pulse repetition rate determines the absolute sampling rates available.

The pulses on the lines TS, S3, S2, S1 need not have the duration or pulse shape shown in FIG. 3. The incrementing arrangement in the working store WS which is controlled by the control output of the AWDD circuit may be a simple digital adding circuit for adding given increments as described. While the system herein described requires the channels to be represented in the working store by address-words forming a readily generated sequence, the address translator unit allows these address-words to be translated into any desired channel addresses by a one-to-one mapping, allowing any chosen channel to be related to any chosen address-word. The address translator AT is a conventional store having one storage location for each address-word which may be developed on the output of the AWDD circuit, in which the address of the related data input channel (or the address of the data channel gate controlling it) is stored. For instance, in the example hereinbefore described using address-words 30, 31 etc if the channels required to be sampled four times a frame are channels 18 and 42 then the addresses 18 and 42 will be stored in locations 30 and 31 respectively of the address translator AT. In addition to these addresses, the locations in the address translator may also store signals representing parameters of the channel concerned; for instance the mode of the signals developed on the channel (unipolar, bipolar, multilevel or analogue), their signal strength or the amplification which they are expected to need, their bandwidth or a choice of filter through which they should be passed. When any selected address-word is applied to the address translator AT, it transmits the contents of a corresponding location to the address translator outputs. The address translator is loaded so that this action sends the appropriate stored channel address to a decoder in the array of data channel gates DCG which then opens the appropriate data channel gate, and the address translator AT also applies the corresponding parameter signals to the lines M, G, B, S. These signals can be used to control other apparatus (not shown) for processing and/or recording the data channel signals. Clearly the choice of channels for sampling may be changed by changing the translator unit. The translator unit could also be arranged to provide an output for controlling the precision with which any data signal is digitized or transmitted by associated equipment.

For simplicity, the examples herein described have involved only a small number of samples and a small number of sampling rates, but clearly the apparatus can be extended to allow for any desired number of sampling rates; this requires only larger stores and an extension of the chain of divider circuits and and-gates (T2, T3, T4 and X1, X2, X3) and extra stages on the register X4.

I claim:

1. A data-signal switching apparatus for controlling the switching and time-division multiplexing of signals appearing on a multitude of data input channels so that the signals on various data input channels will be sampled at various selected sampling rates and transmitted in a time-division multiplex cycle with a prescribed time-slot rate, the said apparatus including:

- a pulse generator means for providing pulses at a rate $p$ times the time-slot rate, where $p$ is a positive integer;
- a timing circuit means controlled by the pulse generator means for forming at each of a plurality of outputs a separate one of a plurality of periodic pulse sequences, said plurality of periodic pulse sequences comprising a sequence of pulses at the time-slot rate and a separate restarting pulse sequence for each of the required sampling rates having a pulse repetition rate equal to the associated sampling rate;
- a working store capable of storing one address word for each of the sampling rates required;
- address resetting means controlled by the timing circuit means, capable of storing a set of starting address words comprising one starting address word for each sampling rate and constructed to act in response to each pulse of each restarting pulse sequence by replacing one of the address words in the working store with a starting address word associated with the sampling rate of the restarting pulse sequence to which the pulse belongs;

a time-division-multiplex circuit which includes a plurality of gate circuits separately connected to different data input channels, address input means, and a decoder circuit connected to control the gate circuits so as to respond to the application of an address word to the address input means by enabling an associated one of the gate circuits to pass signals from the data input channel to which it is connected;

and a logic circuit means controlled by the timing circuit means for selecting one of the address words held in the working store in each time-slot, applying the selected word to the address input means of the time-division-multiplex gating circuit, and adding a predetermined increment to the selected word in the working store to form a new address word.

2. A data-signal switching apparatus as claimed in claim 1 wherein the said pulse generator means is constructed to provide shift rate pulses at a rate $p$ times the said prescribed time-slot rate where $p$ is an integer not less than the number of different sampling rates required, whereby each time-slot is sub-divided into $p$ sub-divisions and each sampling rate is associated with a given one of the sub-divisions in each time-slot; said working store comprising a recirculating store of $p$ stages having a shift input connected to receive the shift rate pulses from the pulse generator means.

3. A data-signal switching apparatus as claimed in claim 2 wherein the timing circuit means comprises a counter circuit connected to count the shift rate pulses, and the address resetting means comprises a storage means capable of storing at least one set of starting address words which includes one starting address word for each sampling rate required and having address inputs connected to the said counter circuit, and gate circuit means controlled by the restarting pulses from the timing circuit means for controlling the readout of starting address words from the storage means to the working store.

4. A data-signal switching apparatus as claimed in claim 3 wherein the logic circuit means comprises a comparator circuit connected to compare signals from the said storage means and the said working store, and a gate circuit controlled by the comparator circuit.

5. A data-signal switching apparatus as claimed in claim 3 wherein the logic circuit means comprises gate circuits having inputs connected to the working store, and an adder circuit means, controlled by the gate circuits, for summing signals from the said storage means and the said working store.

* * * * *